J. H. ROBERTS.
THERMOSTATIC CONTROL OF FURNACES.
APPLICATION FILED APR. 12, 1913.
1,154,207.
Patented Sept. 21, 1915.
2 SHEETS—SHEET 2.
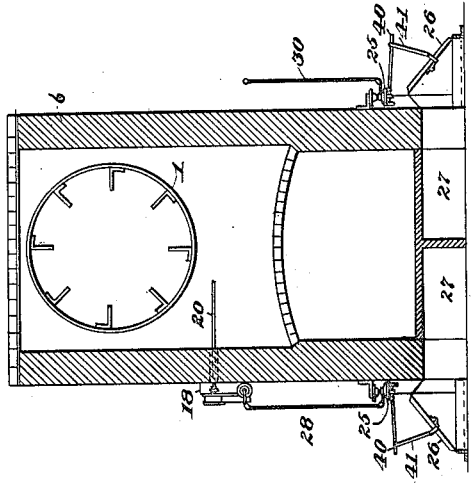
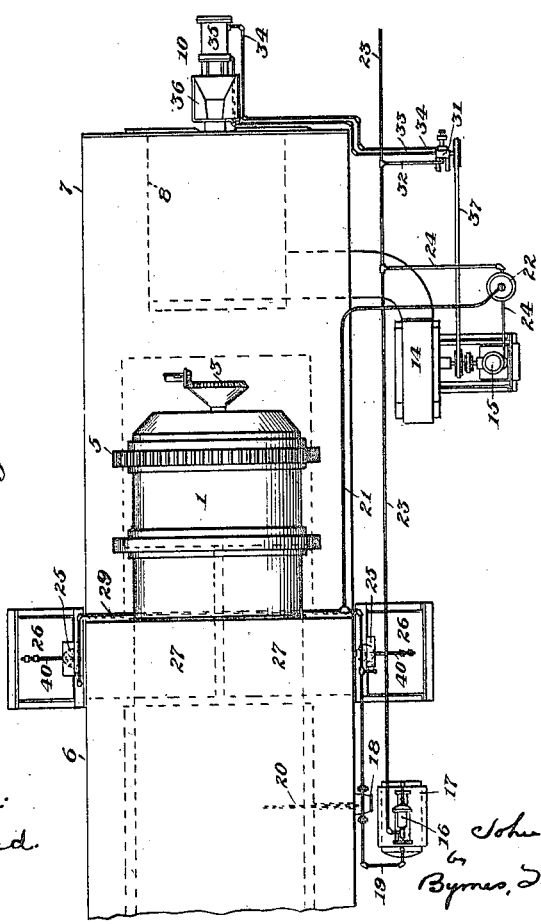

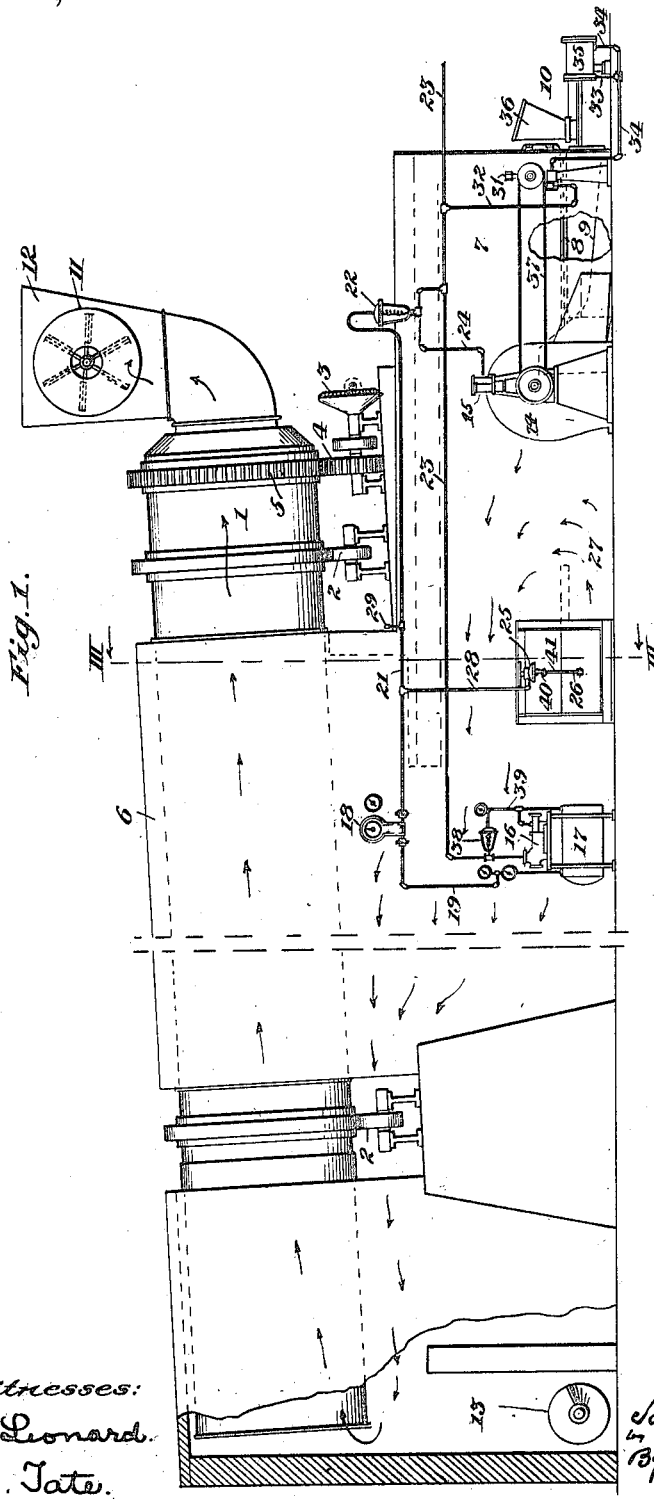

UNITED STATES PATENT OFFICE.

JOHN HENRY ROBERTS, OF CHICAGO, ILLINOIS.

THERMOSTATIC CONTROL OF FURNACES.

1,154,207.  Specification of Letters Patent.  Patented Sept. 21, 1915.

Application filed April 12, 1913. Serial No. 760,677.

*To all whom it may concern:*

Be it known that I, JOHN HENRY ROBERTS, a citizen of the United States, residing at Chicago, in the county of Cook and State of Illinois, have invented certain new and useful Improvements in Thermostatic Control of Furnaces, of which the following is a specification.

This invention relates to the thermostatic control of furnaces, with particular application to that class of combined furnaces and driers in which the products of combustion from the furnace are caused to flow in physical contact with the material to be dried.

A primary object of the invention, as applied to devices of the above type, is to provide a method and means for automatically regulating the volume of gas flowing over or through the material, while maintaining a practically constant temperature in the entering gases. This result I accomplish by a thermostatic regulation of the fuel-supply and of the air for fuel-combustion, in conjunction with a simultaneous regulation of air admitted to the gas-stream at a point or points beyond the combustion zone, and between the combustion zone and the thermostat. In this manner, the variations in the quantity of air supplied for the combustion of the fuel may be compensated to any desired degree by corresponding variations in the quantity of air supplied for admixture with the gases of combustion, in such manner as to regulate and control the total volume of gases, and the velocity of the gas-stream. This regulation is of the highest technical importance in all cases in which the evaporation of moisture is required to proceed at a uniform rate, or in which the velocity of the gas-stream must be regulated with reference to its capability of blowing the dried or partially dried material from the apparatus.

For a full understanding of my invention, it will be described by reference to a preferred embodiment thereof, as shown in the accompanying drawings, it being understood that the invention is not restricted in its application to the particular type of furnace or drier chosen for illustration.

In said drawings—Figure 1 is a side elevation of a typical furnace and drier, the central portion being broken away, showing the application thereto of the thermostatic regulator embodying my invention; Fig. 2 shows one end of the apparatus of Fig. 1, viewed from above, the feed-hopper being removed; and Fig. 3 is a vertical section on line III—III of Fig. 1.

1 represents an inclined cylindrical drier which may be of any preferred construction, mounted for rotation upon rollers 2, 2, and driven by a bevel-gear 3 operating a pinion 4 which engages the circular rack 5. The cylinder is inclosed by the usual masonry walls 6, and under its forward end is a mechanically-operated furnace 7, which may be of any desired character or construction, and adapted for the consumption of coal, oil or other fuel.

The drawings illustrate a coal furnace having grate bars 8, a coking retort 9, and a steam-operated mechanical stoker 10. The combustion gases from the furnace flow beneath and around the drying cylinder 1, and thence through the same, and are withdrawn laterally by the suction fan 11, the general path of the gases being as indicated by the arrows on Fig. 1. The material to be dried, as for example a vegetable product, is introduced into the hopper 12, passes through the cylinder 1 in a direction opposite to the gas-flow, and is discharged into the mechanical conveyer 13.

14 is a pressure blower for supplying air beneath the grate 8, and 15 is a steam engine coupled directly to the blower.

The foregoing elements may be of any standard or desired construction.

16 represents an air-compressor, 17 an air-receiving tank, and 18 a thermostatically controlled air-valve in the discharge line 19 from the air-tank 17. The thermostat 20, controlling the valve 18, is located in the path of the combustion gases, and may be of any approved construction, serving merely to open the valve 18 when a definite temperature of the gas is exceeded.

21 represents an air-conduit extending between the air-valve 18 and a diaphragm-valve 22.

23 is a steam-line, having a branch line 24 leading to the cylinder of the blower engine 15, the passage of steam through this branch line 24 being controlled in known manner by the diaphragm-valve 22.

25, 25 are diaphragm-motors connected respectively to a pair of dampers 26, 26 located on opposite sides of the furnace casing, and serving when open to admit air to the flues 27 for admixture with the combustion gases. The diaphragm-motors 25 are operated by air-pressure through branch-conduits 28, 29, 30, leading from the main air-conduit 21. The flues 27 are so located that the air is admitted to the stream of products of combustion at a point between the furnace 7 and the thermostat 20.

31 is a reversing valve or equivalent construction of known type, receiving steam from branch-line 32, and discharging it alternately through pipes 33 and 34, connected to opposite ends of the cylinder 35 of the mechanical stoker 10, and thereby controlling the reciprocation of the stoker piston and the rate of feed of fuel from the hopper 36. The reversing valve 31 is operated by a belt 37 from the blower engine 15, so that the diaphragm-valve 22 controls simultaneously and proportionately the rate of supply of fuel by the stoker, and the air-supply for fuel-combustion by the blower 14.

Constant air-pressure in the tank 17 is maintained by providing a diaphragm-valve 38, governing the steam-supply to the air-compressor 16, and controlled by the air-pressure in tank 17, through a pipe connection 39.

The construction of the several individual elements above mentioned, viz., the thermostat 20 and the air-valve 18 controlled thereby, and the controlling devices 22 and 25, forms no part of the present invention, and all of said elements may be of any standard or approved type.

The mode of operation of the above-described controlling apparatus is as follows: The thermostatic valve 18 is so adjusted that it will remain closed at the gas-temperature which it is desired to maintain, but will open in case such temperature is exceeded. So long as such temperature is not exceeded, the fuel and the air for fuel combustion will be supplied at the normal rate, and the dampers 26 will either remain closed, or they may be set in a partially open position to supply the desired amount of auxiliary air to maintain the proper normal volume and velocity of air-flow. The capacity of the furnace and stoker should of course be sufficient readily to maintain the desired temperature.

In case the temperature of the gas exceeds the desired degree, the thermostatic valve 18 opens, admitting air under pressure to the diaphragm-valve 22, which then acts to cut off or reduce the steam-supply to the engine 15, with the result that a lesser quantity of air is supplied for combustion: at the same time the rate of fuel-supply is proportionately decreased by the reduction in the speed of the stoker engine. The temperature of the gases is therefore quickly reduced to the desired standard, whereupon the thermostatic valve 18 again closes, and the fuel and air for combustion purposes are again supplied at the normal rate. In this manner the temperature of the gases is controlled with great accuracy.

A temperature-control simply as above described would involve a fluctuation of the volume of the gas traversing the drier, inasmuch as the control of the temperature is effected by varying the amount of air supplied for combustion; and such fluctuation is in practice highly objectionable, for the reason that it involves a corresponding fluctuation in the evaporative capacity of the gases, and hence in the moisture-content of the material to be dried, assuming the latter to pass through the apparatus at a uniform rate. According to my invention, such fluctuation is overcome by the provision of the air-dampers 26, controlled by the diaphragm-motors 25. Admission of air to the diaphragm-motors 25 causes these to actuate the levers 40, with their connecting links 41, and thereby to open the dampers 26, through which air is drawn under the constant draft of the suction fan 11. By adjusting the position of the links 41, the degree to which the dampers 26 are opened may be so controlled as to compensate with any degree of accuracy for the reduced supply of air from the blower 14, thereby avoiding or minimizing the fluctuations in the volume and velocity of the gases. It will thus be seen that the invention provides for the automatic regulation of the temperature of the gas-stream, without varying the volume or velocity of the gas, or with such cor ol of the volume and velocity of the gas-stream as may be practically necessary under the circumstances arising in the treatment of any particular material.

I claim:—

1. The herein-described method of regulating the volume of a current of gases of combustion under substantially constant temperature-conditions, which consists in thermostatically regulating the fuel-supply and the air for fuel-combustion in accordance with the temperature of the gas-current, and effecting a simultaneous adjustment of the volume of the gas-current by controlling the admission of air thereto beyond the combustion zone.

2. Apparatus for regulating the volume of a current of gases of combustion under substantially constant temperature-conditions, comprising means for thermostatic regulation of the fuel-supply and the air for fuel-combustion in accordance with the temperature of the gas-current, in combination with means for simultaneously controlling the admission of air to said gas-current beyond the combustion zone.

In testimony whereof I affix my signature in presence of two witnesses.

JOHN HENRY ROBERTS.

Witnesses:
MABEL HASELTINE,
L. W. BROCKETT.